(12) United States Patent
Robert Safavi et al.

(10) Patent No.: US 10,128,983 B2
(45) Date of Patent: Nov. 13, 2018

(54) TRANSMITTER AND RECEIVER DEVICES PERFORMING REPETITION BEFORE INTERLEAVING AND PUNCTURING AFTER INTERLEAVING AND METHODS THEREOF

(71) Applicant: Huawei Technologies Co., Ltd., Shenzhen (CN)

(72) Inventors: Anahid Robert Safavi, Kista (SE); Branislav M. Popovic, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/377,688

(22) Filed: Dec. 13, 2016

(65) Prior Publication Data

US 2017/0093529 A1 Mar. 30, 2017

Related U.S. Application Data

(63) Continuation of application No. PCT/EP2014/062359, filed on Jun. 13, 2014.

(51) Int. Cl.
*H04B 1/707* (2011.01)
*H04L 1/00* (2006.01)

(52) U.S. Cl.
CPC .......... *H04L 1/0071* (2013.01); *H04B 1/707* (2013.01); *H04L 1/0067* (2013.01); *H04B 2201/70703* (2013.01)

(58) Field of Classification Search
CPC .......... H04B 1/707; H04B 2201/70703; H04L 1/0067; H04L 1/0071
See application file for complete search history.

(56) References Cited

U.S. PATENT DOCUMENTS

| | | | | |
|---|---|---|---|---|
| 6,397,367 B1 * | 5/2002 | Park | .................. | H03M 13/2957 375/265 |
| 7,178,089 B1 * | 2/2007 | Frenger | ................. | H04L 1/0003 714/704 |

(Continued)

FOREIGN PATENT DOCUMENTS

| | | |
|---|---|---|
| EP | 1045522 A1 | 10/2000 |
| JP | 2006320008 A | 11/2006 |

(Continued)

OTHER PUBLICATIONS

Akihiko et al ("Study on Wideband CDMA System in Burst Error Environment") IEEE-1997, pp. 324-328.*

(Continued)

*Primary Examiner* — Phung M Chung
(74) *Attorney, Agent, or Firm* — Conley Rose, P.C.

(57) ABSTRACT

The present disclosure relates to transmitter and receiving devices for wireless communication, where the transmitter device comprises a transceiver configured to receive at least one stream of information bits; and further comprises a processor configured to encode said at least one stream of information bits using at least one error correction code to obtain at least one mother code word having a mother code rate $R_M$; obtain a shortened code word or extended code word based on the determination of whether the mother code rate $R_M$ is smaller than a transmission code rate $R_{Tx}$; modulate said shortened or extended code word to obtain modulated symbols; wherein said transceiver is further configured to transmit a signal comprising said modulated symbols over a radio channel of the wireless communication system. Furthermore, the present disclosure also relates to corresponding methods, a computer program, and a computer program product.

17 Claims, 11 Drawing Sheets

(56) References Cited

U.S. PATENT DOCUMENTS

| | | | |
|---|---|---|---|
| 7,581,159 B2 * | 8/2009 | Hocevar | H03M 13/116 714/758 |
| 2004/0073863 A1 | 4/2004 | Moulsley | |
| 2007/0242737 A1 | 10/2007 | Tzannes | |
| 2008/0063014 A1 | 3/2008 | Belaiche | |

FOREIGN PATENT DOCUMENTS

| | | | |
|---|---|---|---|
| JP | 2013066206 A | 4/2013 | |
| KR | 100966059 B1 | 6/2010 | |
| WO | 2015000511 A1 | 1/2015 | |

OTHER PUBLICATIONS

Freger et al ("Rate Matching in Multi-Channel Systems using RCPC-Codes") IEEE-1997, pp. 354-357.*
Popovic, B., et al., "Bit-Interleaved Low Density Spread (BI-LDS) Transmission," IEEE Wireless Communications and Networking Conference (WCNC), Apr. 6-9, 2014, pp. 689-694.
Beek, J., et al., "Multiple Access with Low-Density Signatures," IEEE Global Telecommunications Conference, Nov. 30-Dec. 4, 2009, 6 pages.
Hoshyar, R., et al., "Novel Low-Density Signature for Synchronous CDMA Systems Over AWGN Channel," IEEE Transactions on Signal Processing, vol. 56, No. 4, Apr. 2008, pp. 1616-1626.
Samsung, "Rate matching and interleaver for HARQ," 3GPP TSG RAN WG1 Meeting#48-BIS, R1-071578, Mar. 26-30, 2007, 4 pages.
Foreign Communication From a Counterpart Application, PCT Application No. PCT/EP2014/062359, International Search Report dated Jul. 24, 2014, 4 pages.
Foreign Communication From a Counterpart Application, Japanese Application No. 2016-572627, Japanese Office Action dated Jan. 23, 2018, 3 pages.
Foreign Communication From a Counterpart Application, Japanese Application No. 2016-572627, English Translation of Japanese Office Action dated Jan. 23, 2018, 3 pages.
Foreign Communication From A Counterpart Application, Korean Application No. 10-2017-7000985, Korean Notice of Allowance and Brief Translation dated Jun. 19, 2018, 3 pages.

* cited by examiner

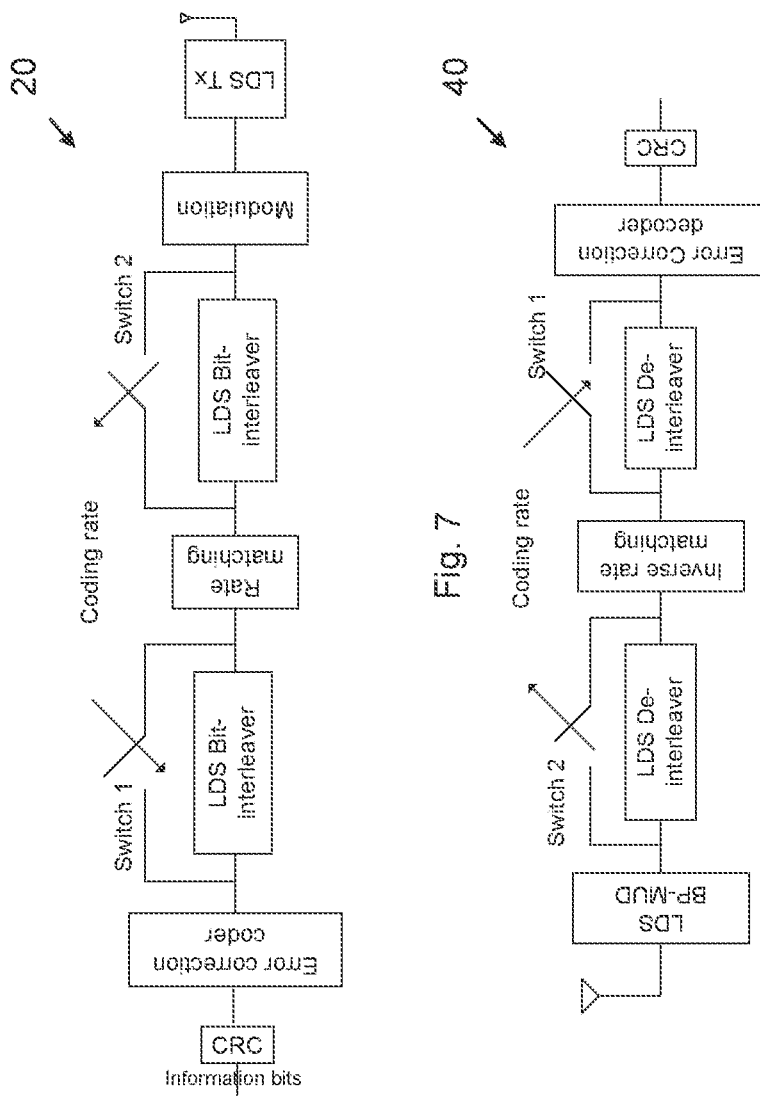

TRANSMITTER AND RECEIVER DEVICES PERFORMING REPETITION BEFORE INTERLEAVING AND PUNCTURING AFTER INTERLEAVING AND METHODS THEREOF

CROSS-REFERENCE TO RELATED APPLICATION

This application is a continuation of International Application No. PCT/EP2014/062359, filed on Jun. 13, 2014, the disclosure of which is hereby incorporated by reference in its entirety.

TECHNICAL FIELD

The present disclosure relates to a transmitter device and a corresponding receiver device for wireless communication. Furthermore, the present disclosure also relates to corresponding methods, a computer program, and a computer program product.

BACKGROUND

One of the major challenges for the next generation of wireless communication systems is to face a considerable traffic growth. Current systems such as Long Term Evolution (LTE) already provide very high peak data rates per user both in the uplink and in the downlink. Therefore, it seems reasonable to consider that such a predicted traffic growth accounts for higher aggregate data rate, i.e. higher spectral efficiency for many simultaneous users or, more in general, many concurrent data streams rather than increasing the per-user spectral efficiency.

For instance, Code Division Multiple Access (CDMA) is one of the most spectrally efficient schemes when considering several users. In order to exploit both the diversity gain and multiple-access capability of CDMA systems while taking advantage of receiver simplicity pertained to orthogonal frequency-division multiplexing (OFDM) systems, the so-called Multi Carrier-(MC)-CDMA systems have been developed, where several codewords are transmitted concurrently (i.e. summed) after spreading and sub-carrier mapping.

Further, overloading is a technique that has been discussed to improve communication systems, i.e. the situation where there are more signature sequences than chips for transmission. In this case, no orthogonal signature sets exists and interference is inherent in the system. Using more signatures than the available chips permits to schedule more users compared to the orthogonal transmission and therefore fulfill the massive connectivity requirement necessary for the next generation of communication systems.

We shall model a received signal vector r consisting of n received chip-values after passing through the additive white Gaussian noise (AWGN) channel, as:

$$r = Sx + z$$

where S is the m×n complex signature matrix (each signature being a column of this matrix), $x \in X^n$ is the column vector containing the modulation symbols each belonging to a given constellation X. Finally, z is the column vector containing complex-valued independent samples of AWGN with variance $\sigma_z^2$.

The optimum demodulator for overloaded MC-CDMA transmission performs joint Maximum Likelihood (ML) detection of the set of information symbols transmitted concurrently using different signatures, and computes the most likely among the transmitted symbol vectors as:

$$\hat{x}_{ML} = \arg \min_{x \in X^n} \|r - Sx\|^2.$$

Such demodulator is typically too complex for practical use as it has to search through all possible sequences $x \in X^n$. A large variety of suboptimal Multiuser Demodulation (MUD) methods have been developed. All of them are, in one way or another, approximations of joint ML demodulation.

MUD receivers are typically still complex, the complexity increasing non-linearly with the length of signatures. Traditionally, MUD methods have been independent of the signature design in which case the MUD implementation complexity is dependent only on the number of signatures. Recently, however, it has been demonstrated that the MUD complexity can be reduced using specially designed so called sparse signatures, accompanied with the usage of joint demodulation based on belief propagation.

If we denote an information symbol modulating a signature as a symbol variable, then the Belief Propagation Multi-User Detector (BP-MUD) can be described as performing a chip-by-chip ML search which involves only a small set of information symbols, i.e. those that contribute to the energy of each particular chip. That set is defined by the non-zero elements in each row of the sparse signature matrix.

Such sparse signatures contain only few non-zero elements. Therefore they are called Low-Density Spreading (LDS) signatures. A LDS signature of length m is a sequence of m spreading symbols (chips) such that $w_c$ chips are not equal to zero, while $m - w_c$ are equal to zero, so that $w_c \ll n$.

The functional block structure of a typical conventional LDS transmitter using only one stream of information bit is given in FIG. 1. After adding Cyclic Redundancy Check (CRC) the information bits are grouped in blocks, and each block is encoded by an error-correction encoder in order to achieve protection against AWGN at the receiver. The encoder, e.g. a convolutional encoder, produces a so-called mother code word. The corresponding code rate $R_M$, defined as the ratio of the number of information bits divided by the number of coded bits in the code word, is called mother code rate.

In practice in order to match the transmission code rate of the communication channel (i.e. available physical resources or resource elements dedicated to data transmission) a mother code word size is adjusted during the transmission. The adjustment is done in the rate matching block, either by puncturing (to shorten the mother code word) or by repetition (to extend the mother code word). Rate matching allows a single encoder to be used for plurality of data channels with different data transmission rate. The term code word is used in this disclosure to denote the encoded bits after the encoder/encoding unit or after rate matching unit. Right after the encoding unit a mother codeword is generated. After the rate matching unit a shortened or an extended code word is generated.

Assume without loss of generality the case of a non-systematic convolutional encoder. The encoder receives an input sequence of length L bits and generates N parity streams denoted as $P_1, P_2, \ldots, P_N$ each of length L. As an example the encoder may implement a rate ⅓ tail-biting convolutional code with constraint length k=7 and the generator polynomial $[133, 171, 165]_O$. In this case, after encoder three parity streams denoted as $P_1$, $P_2$ and $P_3$ are generated. The parity bit stream $P_1$ corresponds to the generator polynomial $[133]_O$, the parity bit stream $P_2$ corresponds to the generator polynomial $[171]_O$ and the parity bit stream $P_3$ corresponds to the generator polynomial $[165]_O$. Parity bit streams are then fed to the rate matching unit.

When a rate ⅓ convolutional code is required, the rate matching circuit outputs all of the parity bits in all of three parity bit streams. The rate matching circuit outputs all of the parity bits in group multiplexed format. That is, the rate matching circuit outputs the parity bits corresponding to the parity bit stream $P_1$ first, following the parity bit stream $P_2$ which is followed by parity bit stream $P_3$.

When a code rate higher than ⅓ is required to match the rate of the communication channel, rate matching circuit outputs less than all of the parity bits by puncturing some of the selected parity bits. When puncturing parity bits, the rate matching circuit punctures parity bits corresponding to the bit stream $P_3$ first, followed by parity bits corresponding to parity bit stream $P_2$. That is, no parity bits from parity bit stream $P_2$ are punctured until all the parity bits from parity bit stream $P_3$ are punctured. The remaining parity bits which have not been punctured are output in group order as described previously. Thus, for a rate ½ convolutional code, the rate matching circuit punctures all the bits corresponding to parity bit stream $P_3$.

In order to obtain a code rate between ½ and ⅓, the rate matching circuit punctures some but not all of the parity bits corresponding to parity bit stream $P_3$. To obtain code rates greater than ½, the rate matching circuit punctures all of the parity bits corresponding to parity bit steam $P_3$ and some of the parity bit stream corresponding to parity bit stream $P_2$.

When code rates less than ⅓ are required to match the communication channel, the rate matching circuit outputs the parity bit in each parity stream in group multiplexed order as previously described and then repeats the same output sequence in order, until the desired number of bits have been output. That is, after all the parity bits streams $P_1$, $P_2$ and $P_3$ have been outputted, the rate matching circuit will output repeated parity bits corresponding to parity bit stream $P_1$ first, followed by repeated parity bit stream $P_2$ then followed by parity bits stream $P_3$ until the required number of parity bits are reached.

Implementation wise, rate matching unit might include a circular buffer. The parity bit streams are read into a circular buffer. Thus the parity bits of within circular buffer are ordered by group. The output bits of rate matching circuit are then read sequentially from circular buffer. If the required number of bits is greater than the size of circular buffer, the reading wraps from the end of circular buffer to the beginning.

Turbo code is another example of encoder used in wireless communication systems. In the case of turbo code with mother code rate ⅓, first output stream of the encoder is systematic bit stream and two other output streams (second and third) are parity streams. When performing rate matching, depending on the desired transmission code rate, the second and subsequently first parity streams are punctured similar to the case of convolutional encoder. Then a single output buffer is formed by placing the rearranged systematic bits in the beginning followed by bit by bit interlacing of two rearranged parity streams. In that respect turbo code and convolutional code are different as for convolutional code the parity bits are all ordered sequentially in the buffer.

The LDS interleaver in FIG. 3 which is shown as LDS interleaver block, performs a permutation of the coded bits after rate matching and/or corresponding modulation symbols so that the information bits transmitted in each of the previously mentioned segments of the code word are selected from distant positions in the original code word.

After interleaving, in the last stage of the transmission chain, the LDS Tx block performs spreading and concurrent transmission of information symbols. At the receiver in FIG. 4, received noisy symbols are first fed into LDS BP MUD detector block. The BP detector generates soft values also called bit log likelihood ratio (LLR) values form the received noisy signal. Soft values are afterwards sent to the LDS de-interleaver block. After deinterleaving, the bursts of erroneously estimated soft-values are uniformly distributed over the whole code word.

FIG. 5 shows a LDS bit interleaver block followed by a modulator block. The LDS bit interleaver block in FIG. 5, shown as a LDS bit interleaver, performs permutation of the coded bits after rate matching so that the information bits transmitted in each of the previously mentioned segments of the code word are selected from distant positions in the original code word. Modulation is performed afterwards to map interleaved bits into symbols in the modulation block. After modulation, in the last stage of the transmission chain, the LDS Tx block performs spreading and concurrent transmission of information symbols.

In general case, several streams of information bits are encoded, rate matched, interleaved and modulated. Different resulted modulated symbol streams are linearly combined or superimposed using signature matrix as shown in FIG. 6. In this case, each stream of information bit corresponding possibly to a different user could be encoded using different code rates. More precisely, in FIG. 6 each stream of information bits corresponding possibly to different users presented for instance as "Str.1" etc., is encoded and rate matched by encoder and rate matching block shown as "ENC&RM". After rate matching the resulted codeword is interleaved using the interleaver block shown as "π". Modulation is shown as "Mod." and is performed on the interleaved bits. Resulted symbols after modulation are fed in to a serial to parallel convertor shown as "S/P" in FIG. 6. Modulated symbols resulted from different streams are then fed to the LDS transmitter or "LDS spreader" block. The LDS spreader performs spreading and concurrent transmission of information streams. Its function is similar to the LDS Tx described above taking into account that inputs comes from different streams. The "LDS BP-MUD" detector block in FIG. 6 receives noisy signals and generates soft values corresponding to each information stream. The soft values are thereafter fed into a parallel to serial convertor shown as "P/S" block. De-interleaving blocks shown as "$\pi^{-1}$" is then performed on each stream. After de-interleaving, decoding is performed on each stream.

However, in conventional solutions for code rates where puncturing becomes aggressive, parity bits corresponding to the same codeword are not distributed as much as possible and puncturing might remove away most/all of the corresponding parity bits. This will impact on the error correction capability of the code and consequently achievable performance of the system.

SUMMARY

An objective of the present solution is to provide a solution which mitigates or solves the drawbacks and problems of conventional solutions for transmitting streams of information bits in wireless communication systems.

Another objective is to provide a solution which gives higher performance especially for higher code rates.

Yet another objective is to provide a solution where more information streams can be superimposed for higher code rates and consequently more users can be served in a wireless communication system.

According to a first aspect of the disclosure, the above mentioned and other objectives are achieved with a transmitter device for a wireless communication system, the transmitter device comprising a transceiver configured to receive at least one stream of information bits; and further comprising a processor configured to encode said at least one stream of information bits using at least one error correction code to obtain at least one mother code word having a mother code rate $R_M$; and if the mother code rate $R_M$ is smaller than a transmission code rate $R_{Tx}$ associated with said at least one mother code word, interleave said at least one mother code word to obtain an interleaved code word, and rate match said interleaved code word, to obtain a shortened code word having a code rate that is higher than the mother code rate $R_M$, if the mother code rate $R_M$ is not smaller than a transmission code rate $R_{Tx}$ associated with said at least one mother code word, rate match said at least one mother code word to obtain an extended code word, and interleave said extended code word, having a code rate that is lower than the mother code rate $R_M$; modulate said shortened or extended code word to obtain modulated symbols; wherein said transceiver is further configured to transmit a signal comprising said modulated symbols over a radio channel of the wireless communication system.

According to a second aspect of the disclosure, the above mentioned and other objectives are achieved with a receiver device for a wireless communication system, said receiver device comprising a receiver configured to receive a signal comprising modulated symbols associated with at least one shortened or extended code word having a code rate over a radio channel of the wireless communication system; and further comprising a processor configured to demodulate said received signal to obtain a demodulated signal; and if the code rate is larger than a mother code rate $R_M$ of a mother code word for said shortened or extended code word, de-rate match said demodulated signal to obtain a de-rate matched demodulated signal and de-interleave said de-rate matched demodulated signal to obtain said mother code word, if the code rate is not larger than a mother code rate $R_M$ of a mother code word for said shortened or extended code word code word, de-interleave said demodulated signal to obtain a de-interleaved demodulated signal and de-rate match said de-interleaved demodulated signal to obtain said mother code word; and decode said mother code word to obtain information bits associated with said mother code word.

According to a third aspect of the disclosure, the above mentioned and other objectives are achieved by a transmission method in a wireless communication system, the method comprising the steps of receiving at least one stream of information bits; encoding said at least one stream of information bits using at least one error correction code to obtain at least one mother code word having a mother code rate $R_M$; and if the mother code rate $R_M$ is smaller than a transmission code rate $R_{Tx}$, interleaving said at least one mother code word to obtain an interleaved code word, and rate matching said interleaved code word, to obtain a shortened code word having a code rate that is higher than the mother code rate $R_M$, if the mother code rate $R_M$ is not smaller than a transmission code rate $R_{Tx}$ associated with said at least one mother code word, rate matching said at least one mother code word to obtain an extended code word, and interleaving said extended code word, having a code rate that is lower than the mother code rate $R_M$; modulating said shortened or extended code word to obtain modulated symbols; transmitting a signal comprising said modulated symbols over a radio channel of the wireless communication system.

According to a fourth aspect of the disclosure, the above mentioned and other objectives are achieved by a receiving method in a wireless communication system, the method comprising the steps of receiving a signal comprising modulated symbols associated with at least one shortened or extended code word code word having a code rate over a radio channel of the wireless communication system; demodulating said received signal to obtain a demodulated signal; and if the code rate is larger than a mother code rate $R_M$ of a mother code word for said shortened or extended code word, de-rate matching said demodulated signal to obtain a de-rate matched demodulated signal and de-interleaving said de-rate matched demodulated signal to obtain said mother code word, if the code rate is not larger than a mother code rate $R_M$ of a mother code word for said shortened or extended code word, de-interleaving said demodulated signal to obtain a de-interleaved demodulated signal and de-rate matching said de-interleaved demodulated signal to obtain said mother code word; and decoding said mother code word to obtain information bits associated with said mother code word.

According to a fifth aspect of the disclosure, the above mentioned and other objectives are achieved with a wireless communication system comprising at least one transmitter device and at least one receiver device, said at least one transmitter device comprising a transceiver configured to receive at least one stream of information bits; and further comprising a processor configured to encode said at least one stream of information bits using at least one error correction code to obtain at least one mother code word having a mother code rate $R_M$; and if the mother code rate $R_M$ is smaller than a transmission code rate $R_{Tx}$, interleave said at least one mother code word to obtain an interleaved code word, and rate match said interleaved code word, to obtain a shortened code word having a code rate that is higher than the mother code rate $R_M$, if the mother code rate $R_M$ is not smaller than a transmission code rate $R_{Tx}$ associated with said at least one mother code word, rate match said at least one mother code word to obtain an extended code word, and interleave said extended code word, having a code rate that is lower than the mother code rate $R_M$; modulate said shortened or extended code word to obtain modulated symbols; wherein said transceiver is further configured to transmit a signal comprising said modulated symbols over a radio channel of the wireless communication system; and said at least one receiver device comprising a receiver configured to receive a signal comprising modulated symbols associated with at least one shortened or extended code word code word having a code rate over a radio channel of the wireless communication system; and further comprising a processor configured to demodulate said received signal to obtain a demodulated signal; and if the code rate is larger than a mother code rate $R_M$ of a mother code word for said shortened or extended code word, de-rate match said demodulated signal to obtain a de-rate matched demodulated signal and de-interleave said de-rate matched demodulated signal to obtain said mother code word, if the code rate is not larger than a mother code rate $R_M$ of a mother code word for said shortened or extended code word, de-interleave said demodulated signal to obtain a de-interleaved demodulated signal and de-rate match said de-interleaved demodulated signal to obtain said mother code word; and decode said mother code word to obtain information bits associated with said mother code word.

According to a sixth aspect of the disclosure, the above mentioned and other objectives are achieved by a method in a wireless communication system comprising the steps of receiving at least one stream of information bits; encoding said at least one stream of information bits using at least one error correction code to obtain at least one mother code word having a mother code rate $R_M$; and if the mother code rate $R_M$ is smaller than a transmission code rate $R_{Tx}$, interleaving said at least one mother code word to obtain an interleaved code word, and rate matching said interleaved code word, to obtain a shortened code word having a code rate that is higher than the mother code rate $R_M$, if the mother code rate $R_M$ is not smaller than a transmission code rate $R_{Tx}$ associated with said at least one mother code word, rate matching said at least one mother code word to obtain an extended code word, and interleaving said extended code word, having a code rate that is lower than the mother code rate $R_M$; modulating said shortened or extended code word to obtain modulated symbols; transmitting a signal comprising said modulated symbols over a radio channel of the wireless communication system; and receiving a signal comprising modulated symbols associated with at least one shortened or extended code word having a code rate over a radio channel of the wireless communication system; demodulating said received signal to obtain a demodulated signal; and if the code rate is larger than a mother code rate $R_M$ of a mother code word for said shortened or extended code word, de-rate matching said demodulated signal to obtain a de-rate matched demodulated signal and de-interleaving said de-rate matched demodulated signal to obtain said mother code word, if the code rate is not larger than a mother code rate $R_M$ of a mother code word for said shortened or extended code word, de-interleaving said demodulated signal to obtain a de-interleaved demodulated signal and de-rate matching said de-interleaved demodulated signal to obtain said mother code word; and decoding said mother code word to obtain information bits associated with said mother code word.

The present disclosure also relates to a computer program, characterized in code means, which when run by processing means causes said processing means to execute any method according to the present disclosure. Further, the disclosure also relates to a computer program product comprising a computer readable medium and said mentioned computer program, wherein said computer program is included in the computer readable medium, and comprises of one or more from the group: Read-Only Memory (ROM), Programmable ROM (PROM), Erasable PROM (EPROM), Flash memory, Electrically EPROM (EEPROM), and hard disk drive.

The transmission code rate $R_{Tx}$ is, as discussed above, the code rate of the communication channel obtained based on the number of available resource elements used for data transmission. In other words, it may be equal to the number of information bits divided by the total number of bits transmitted over resource elements used for data transmission.

In conventional transmission an indication to the suitable code rate for transmission is fed back to the transmitter via channel quality indicator (CQI) feedback. The actual transmission code rate $R_{Tx}$ is obtained based on this CQI feedback and the number of physical resources available for data transmission. Therefore, in practice it might be so that the transmission code rate being different from the code rate feedback by CQI feedback after removal of the resource elements used for example for the transmission of reference signal.

By interleaving before or after rate matching depending on the code rate, e.g. fed back from the receiver in CQI feedback, the parity bits corresponding to the same codeword are distributed as much as possible so that puncturing will not remove away all the corresponding parity bits specially for rates where puncturing becomes aggressive.

While for coding rates lower than the mother code rate, the interleaver acts after rate matching block to guarantee a uniform distribution of burst errors taking advantage of larger block length obtained after rate matching. Therefore better performance is achieved which will impact on the maximum number of users and/or streams that can be simultaneously supported in the communication system. Hence, the number of streams and/or users that can be simultaneously multiplexed on the same radio resource is improved compared to conventional solutions and therefore satisfy massive connectivity requirement is provided by the present solution.

According to an implementation form of the first aspect said processor comprises a LDS matrix interleaver for interleaving said at least one mother code word or extended code word. The LDS matrix interleaver is a rectangular interleaver and therefore has the advantage of being very simple interleaver to realize/implement in a transmitter.

According to this implementation form the LDS matrix interleaver may be configured to apply column permutation on elements of interleaver matrices. Column permutation will further break the burst error behavior of errors, thus leading to even better performance and increasing the number of multiplexed data streams or the number of users in the system.

According to this implementation form the LDS matrix interleaver size may be adapted to different code rates associated with different streams of information bits for transmission. The advantage being the possibility of supporting users or data streams with different code rates leading to different interleaver matrix sizes together in concurrent transmissions.

According to this implementation form the LDS matrix interleaver may be configured to add dummy bits to said shortened or extended code word so that a code word length of said shortened or extended code word is a multiple of the number of columns of an interleaver matrix. This will make it more simple to implement the interleaver in the present method. Another advantage with this embodiment is that only one interleaver with fixed matrix size needs to be used for interleaving of multiple streams of information bits with different code rates.

According to an implementation form of the first aspect said transmitter device comprises a CDMA transmitter, a High Speed Downlink Packet Access (HSDPA) transmitter, or a MC-CDMA transmitter adapted for transmitting said signal. The present solution is well suited and performance very well with the mentioned transmission techniques.

According to this implementation form the CDMA, HSDPA, or MC-CDMA transmitter may be configured to use more signature sequences than chips for transmission when transmitting said signal. This is therefore the overloading case allowing more users.

According to this implementation form the signature sequences may be sparse signature sequences. In this way, a computationally attractive detector could be used in the receiver.

According to an implementation form of the first aspect said transmitter device comprises a Multiple Input Multiple Output (MIMO) transmitter configured for transmitting said signal. The present solution is well suited and performance very well with the mentioned MIMO technique.

According to an implementation form of the first aspect said error correction code may be a turbo code or a convolutional code. Mentioned error correction codes are well suited for the present solution.

It should be realized that the present methods can be modify, mutatis mutandis, to fully correspond to all embodiments of the present transmitter device and receiver device. At least the following implementation forms are addressed in the present disclosure.

According to an implementation form of the third aspect, the interleaving steps involve using a LDS matrix interleaver for interleaving said at least one mother code word or extended code word.

According to this implementation form, the interleaving steps involve applying column permutation on elements of interleaver matrices.

According to these implementation forms, the interleaving steps involve adapting the LDS matrix interleaver size to different code rates associated with different streams of information bits for transmission.

According to these implementation forms, the interleaving steps involve adding dummy bits to said shortened or extended code word so that a code word length of said shortened or extended code word is a multiple of the number of columns of an interleaver matrix.

According to an implementation form of the third aspect, the transmitting step involves using a transmission scheme in the group comprising CDMA, HSDPA, and MC-CDMA.

According to this implementation form, the transmitting step involves using more signature sequences than chips for transmission when transmitting said signal.

According to this implementation form, the signature sequences are sparse signature sequences.

According to another implementation form of the third aspect, the transmitting step involves using a MIMO transmitting scheme.

According to another implementation form of the third aspect, said error correction code is a turbo code or a convolutional code.

It should be noted that further applications and advantages of the disclosure will be apparent from the following detailed description.

BRIEF DESCRIPTION OF THE DRAWINGS

The appended drawings are intended to clarify and explain different embodiments of the present disclosure, in which:

FIG. 7 shows a block diagram of LDS transmission scheme including interleavers;

FIG. 8 shows a block diagram of LDS reception scheme including interleavers;

DETAILED DESCRIPTION

Typically, most error correcting codes are designed to protect against statistically independent errors. For example, such errors occur on the AWGN communication channel as a consequence of the thermal noise of the receiver input and in the first radio frequency (RF) stages. On fading channels, instead, large amplitude variations of the received signal whose duration exceeds a number of signaling intervals results in bursts of erroneously received information symbols. Because of that, the bit errors at the receiver are not statistically independent, and therefore the error correction code designed for the AWGN channel would not be capable to effectively protect information on burst-error communication channels.

A simple and effective method for bit error correction on burst-error channels is to use the available codes designed for the AWGN channel along with an additional functional block, called (channel) bit interleaver, which performs permutation of the bits of each (rate-matched) code word. The corresponding inverse permutation is performed by the de-interleaver operating at the receiver. The de-interleaver transforms a burst of errors into a disperse pattern of errors possibly spanning multiple code words. In such case, the number of errors per code word is reduced, and thus the error correction capability of the overall scheme is enhanced. As far as convolutional codes are concerned, the bit de-interleaver can spread the errors of a burst over a wider interval, thus rendering a non-correctable error pattern into a correctable one. In these cases, a good bit interleaver is such that two adjacent bits in error in the received code word are separated by a large distance after deinterleaving.

Figures 1, 2:
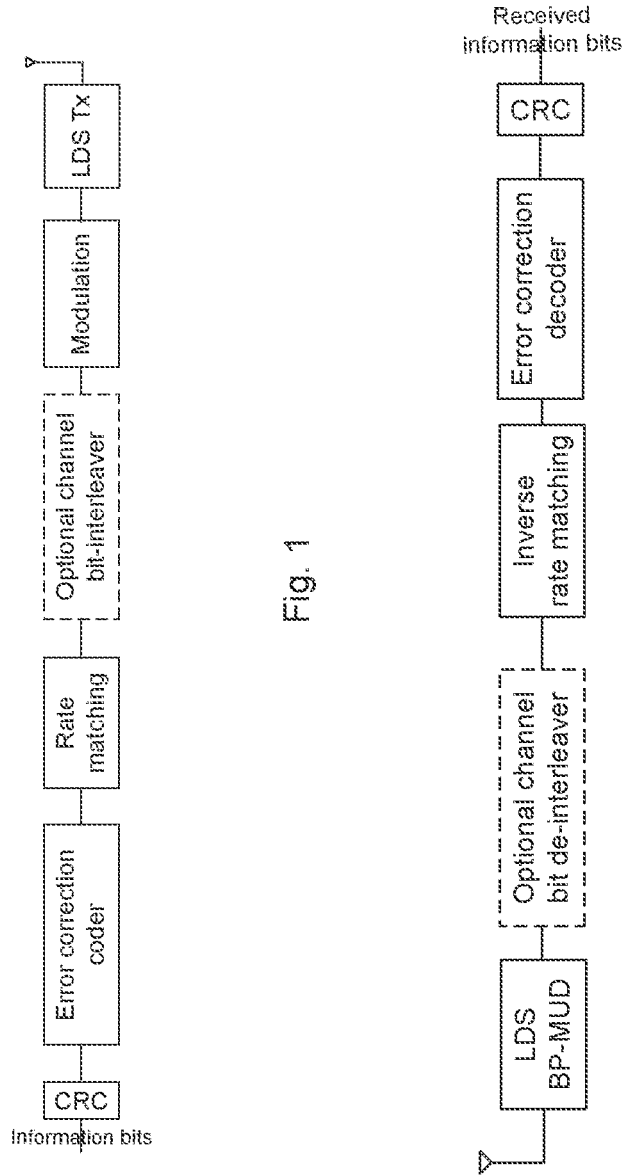
FIG. 1 shows a block diagram of conventional transmitter in LDS communication system.
FIG. 2 shows a block diagram of a conventional receiver in a LDS communication system.

Note that, on the AWGN channel, as long as noise samples are statistically independent, the interleaver and the de-interleaver have no impact on the link performance of a system without LDS. Therefore the channel bit interleaver in FIG. 1 is denoted as optional. In the last stage of the transmitter chain, the LDS Transmit (Tx) stage performs spreading and concurrent transmission of multiple information symbols.

The corresponding conventional LDS receiver is shown in FIG. 2. The BP-MUD demodulator generates soft values, i.e. LLR, of the coded bits. After deinterleaving (performed only if there is a bit interleaving operation at the transmitter), the computed LLRs are fed to the error correction decoder. The LLR calculation in the BP-MUD is done once the BP-MUD iterative processing is finished. It uses the final estimated probabilities of all possible symbols from the modulation constellation for each code channel, i.e. for each signature.

In other words, the BP-MUD performance is determined by the performance of the estimation of transmitted modulation symbols, meaning that the bits inside these symbols are not directly estimated.

From the observations, the connections between each chip and the corresponding symbol variables allow almost ML detection performance of the sequence of n symbol variables transmitted in a LDS transmission interval, but in the same time might be source of a relatively long sequence of erroneously detected symbols.

Numerical simulations confirmed that it happens indeed, even at high Signal-to-Noise Ratios (SNRs) at the receiver, even if the average symbol or bit error rate is quite low, after averaging over a large number of LDS transmission intervals, the instantaneous error rate obtained as the number of erroneously detected symbols in a single LDS transmission interval can be rather high; sometimes more than 50% of n concurrently transmitted modulation symbols can be erroneously detected. These erroneous detected LDS segments are followed by a large number of correct segments, which make the overall average error rate low. Such burst-error behavior of LDS BP-MUD on AWGN channel seems to be its fundamental inherent drawback.

When error correction coding is included in the LDS transmission, the code word is modulated into a vector of $N_{CWS}$ symbols, where typically $N_{CWS} \gg n$. Therefore, the word of modulated symbols has to be fragmented into $N_{LDS}$ segments, each consisting on n modulation symbols, so that $$N_{LDS} = \left\lceil \frac{N_{CWS}}{n} \right\rceil \quad \text{eq.(1)}$$

If $N_{CWS}$ is not an integer multiple of n, $N_{CWS}-nN_{LDS}$ padding bits are appended to the code word.

The error bursts of LDS BP-MUD, which may occur after reception of some segments of the code word, even on AWGN channel, result in the bursts of erroneous LLRs which prevent correct decoding. Consequently, if one compares the performance of LDS transmission to the performance of a conventional communication system on the AWGN channel, either without error correction coding, the performance of uncoded LDS transmission is relatively worse than that of coded LDS transmission. In other words, the SNR gain provided by error correction coding is less pronounced with LDS transmission than with ordinary transmission.

In order to evenly distribute symbol errors generated by the LDS BP-MUD in one LDS reception interval into a large interval, it has been proposed to introduce additional functions in the conventional LDS transmitter and receiver. These functions are called LDS interleaver and LDS de-interleaver. The resulting transmission scheme is called BI-LDS, and the corresponding transmitter and receiver schemes are shown in FIGS. 3 and 4.

Figure 3:
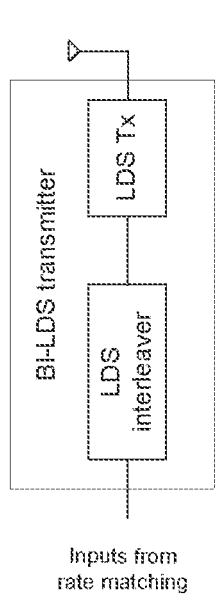
FIG. 3 shows a block diagram of transmitter in the bit-interleaved low density spreader (BI-LDS) communication system.
Figure 4:
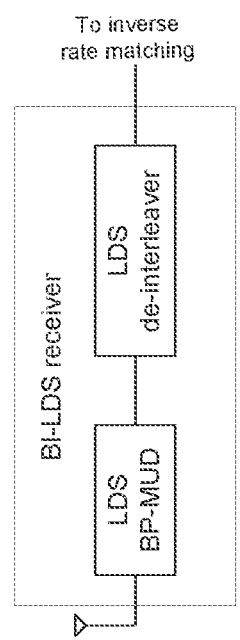
FIG. 4 shows a block diagram of a receiver in BI-LDS communication system.

The LDS interleaver in FIG. 3 performs a permutation of the coded bits after rate matching and/or corresponding modulation symbols so that the information bits transmitted in each of the previously mentioned segments of the code word are selected from distant positions in the original code word. At the receiver in FIG. 4, after deinterleaving, the bursts of erroneously estimated soft-values are uniformly distributed over the whole code word. The LDS de-interleaver in FIG. 4 performs de-interleaving of bit LLR values obtained after LDS BP-MUD.

Figure 5:
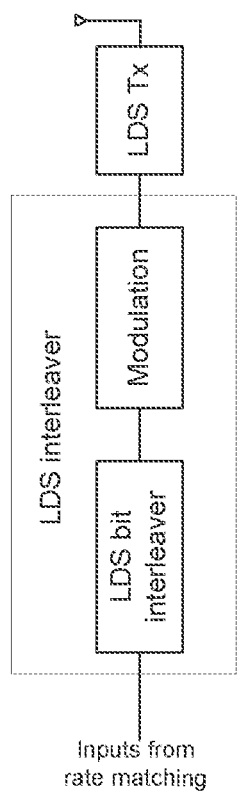
FIG. 5 shows a block diagram of the transmitter in a BI-LDS communication system with LDS bit interleaver.

Proposed interleaver can be implemented as a specially designed LDS bit interleaver, followed by a modulator as shown in FIG. 5.

The LDS bit interleaver that maximizes the distance between any two coded bits transmitted in any of the LDS transmission intervals corresponding to different segments of a single error correction codeword is the one which we will call the Maximum Distance Separable (MDS) bit interleaver.

The MDS bit interleaver maps any two neighboring bits in the original code word into two new positions in the interleaved code word so that the minimum distance between such two new positions cannot be larger. In other words, such LDS bit interleaver exhibits a property that we call Maximum Distance Separability (MDS).

The MDS type of LDS bit interleaver can be implemented as a matrix, as shown in the following matrix. The MDS can be described as a matrix of size $N_{LDS} \times nM$, M being the number of bits transmitted in each modulation symbol, where the whole code word of $N_{CWB}=MN_{CWS}$ bits is written column-wise into the matrix, then the complete rows are read into the LDS transmitter at successive transmission intervals.

$$\begin{bmatrix} 1 & N_{LDS}+1 & \ldots & (Mn-1)N_{LDS}+1 \\ 2 & N_{LDS}+2 & \ldots & (Mn-1)N_{LDS}+2 \\ \vdots & \vdots & \ddots & \vdots \\ N_{LDS} & 2N_{LDS} & \ldots & MN_{CWS} \end{bmatrix}$$

This structure is known as rectangular interleaver.

Figure 6:
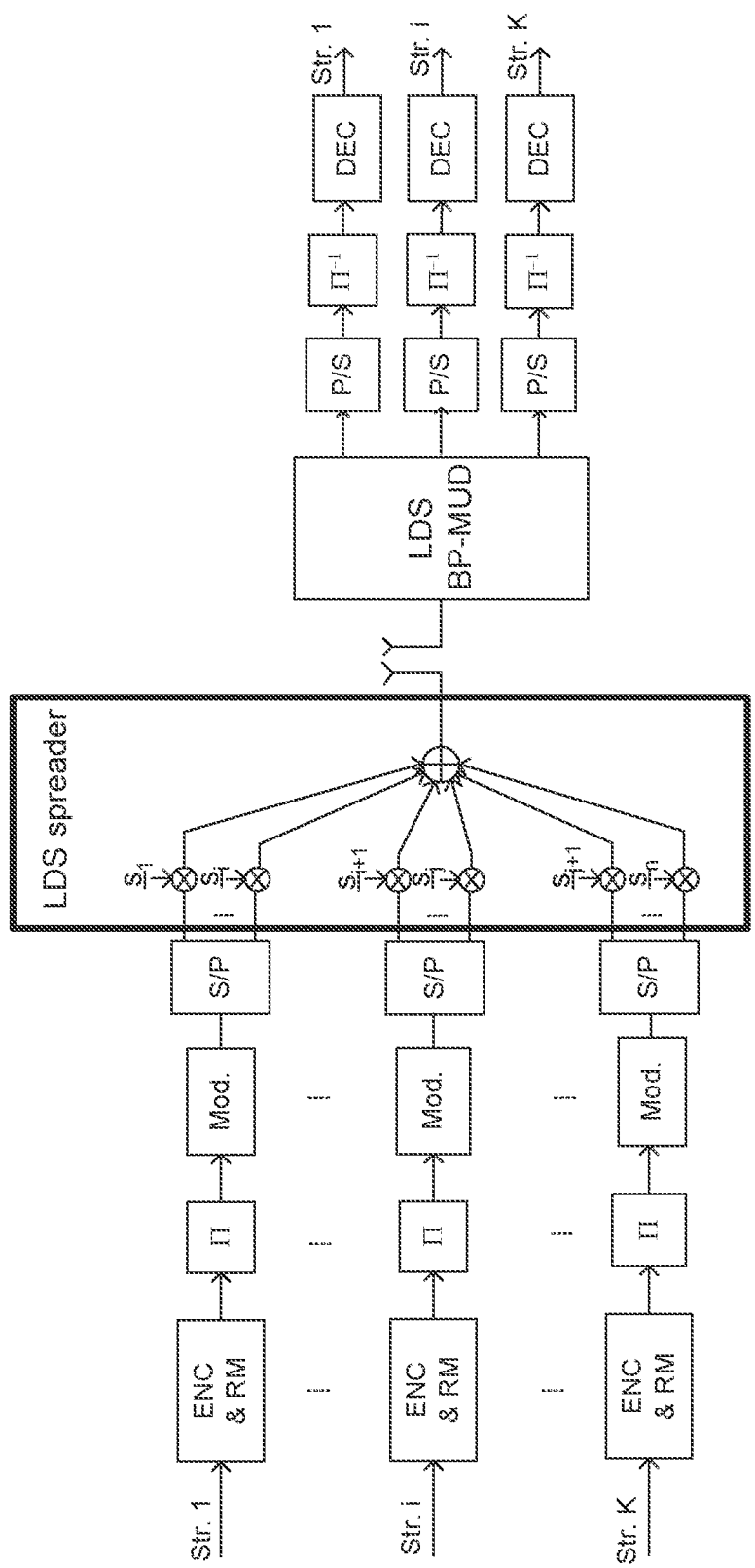
FIG. 6 shows a block diagram of BI-LDS communication system when several data streams are superimposed.

In general case, several streams of information bits are encoded, rate matched, interleaved and modulated. Different resulted modulated symbol streams are linearly combined or superimposed using signature matrix as shown in FIG. 6. In this case, each stream of information bit corresponding possibly to a different user could be encoded using a different code rate.

The present solution relates to transmitting and receiving device for wireless communication systems and corresponding methods thereof.

Figure 12:
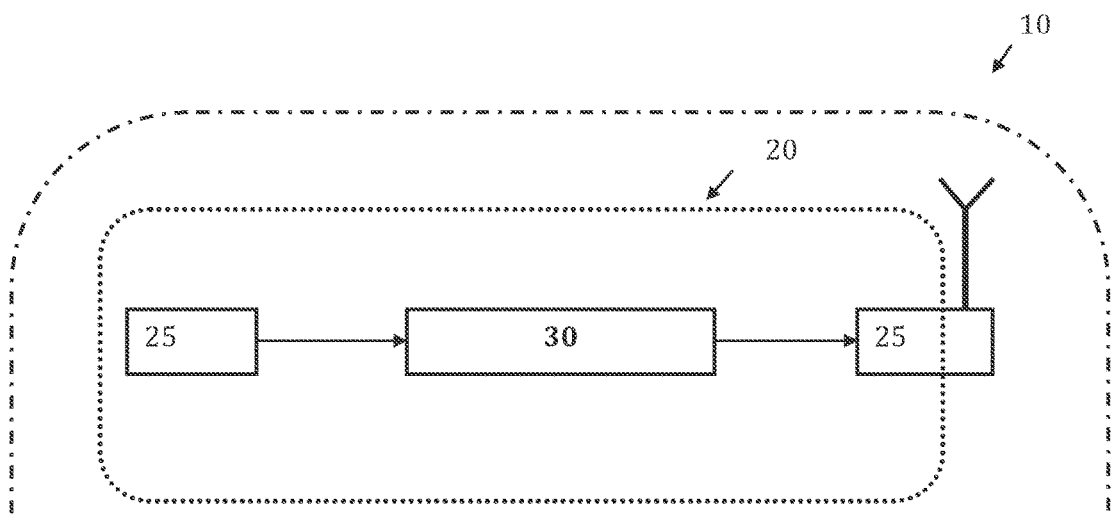
FIG. 12 shows an embodiment of a transmitter device.

With reference to FIG. 12 the present transmitting device 20 comprises a transceiver 25 configured to receive at least one stream of information bits. The device further comprises a processor 30 configured to encode said at least one stream of information bits using at least one error correction code to obtain at least one mother code word having a mother code rate $R_M$. If the mother code rate $R_M$ is smaller than a transmission code rate $R_{Tx}$, interleave said at least one mother code word to obtain an interleaved code word, and rate match said interleaved code word, to obtain a shortened code word having a code rate that is higher than the mother code rate $R_M$. However, if the mother code rate $R_M$ is not smaller than a transmission code rate $R_{Tx}$ associated with said at least one mother code word, rate match said at least one mother code word to obtain an extended code word, and interleave said extended code word, having a code rate that is lower than the mother code rate $R_M$. The shortened or extended code word is modulated so as to obtain modulated symbols. The transceiver 25 is further configured to transmit a signal comprising said modulated symbols over a radio channel of the wireless communication system 10.

Such a transmitter device 20 is as mentioned shown in FIG. 12, in which the processor 30 receives streams of information bits from the transceiver 25 and process them according to the present solution. After processing by the processor 30 the transceiver 25 transmits a signal comprising modulated symbols. Mentioned units are shown in FIG. 12.

Alternatively the present transmitter device 20 may comprise dedicated units for performing the present solution. That is, the transmitter device 20 comprises in this case:

a receiving unit for receiving at least one stream of information bits;

an encoding unit for encoding said at least one stream of information bits using at least one error correction code to obtain at least one mother code word having a mother code rate $R_M$, the encoding unit can also be called encoder; and decision unit for deciding/determine if the mother code rate $R_M$ is smaller or not smaller than a transmission code rate $R_{Tx}$ associated with said at least one mother code word, i.e. $R_M < R_{Tx}$, interleaving and rate matching units for interleave said at least one mother code word to obtain an interleaved code word, and rate match said interleaved code word, to obtain a shortened code word having a code rate that is higher than the mother code rate $R_M$, or rate matching and interleaving units for rate match said at least one mother code word to obtain an extended code word, and interleave said extended code word, having a code rate that is lower than the mother code rate $R_M$;

a modulator for modulating said shortened or extended code word to obtain modulated symbols; and a transmitter unit for transmitting a signal comprising said modulated symbols over a radio channel of the wireless communication system 10.

Figure 14:
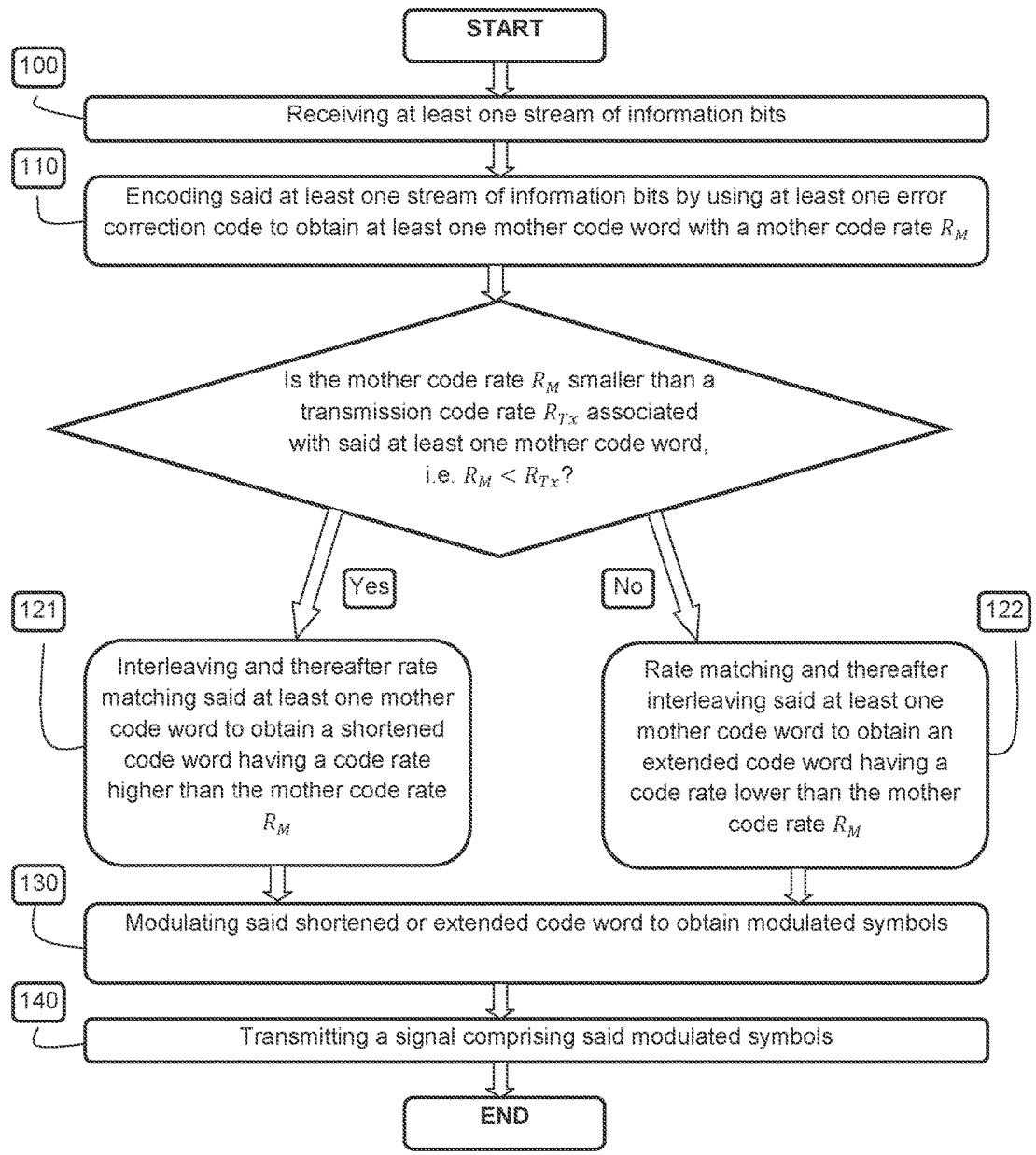
FIG. 14 shows a flow chart of a method in a transmitter.

A corresponding method in a transmitter device is shown in FIG. 14. The present method comprises the steps of receiving 100 at least one stream of information bits; encoding 110 said at least one stream of information bits using at least one error correction code to obtain at least one mother code word having a mother code rate $R_M$; and if the mother code rate $R_M$ is smaller than a transmission code rate $R_{Tx}$, interleaving said at least one mother code word to obtain an interleaved code word, and rate matching said interleaved code word, to obtain a shortened code word having a code rate that is higher than the mother code rate $R_M$ 121, if the mother code rate $R_M$ is not smaller than a transmission code rate $R_{Tx}$ associated with said at least one mother code word, rate matching said at least one mother code word to obtain an extended code word, and interleaving said extended code word, having a code rate that is lower than the mother code rate $R_M$ 122; modulating 130 said shortened or extended code word to obtain modulated symbols; transmitting 140 a signal comprising said modulated symbols over a radio channel of the wireless communication system 10.

Figure 13:
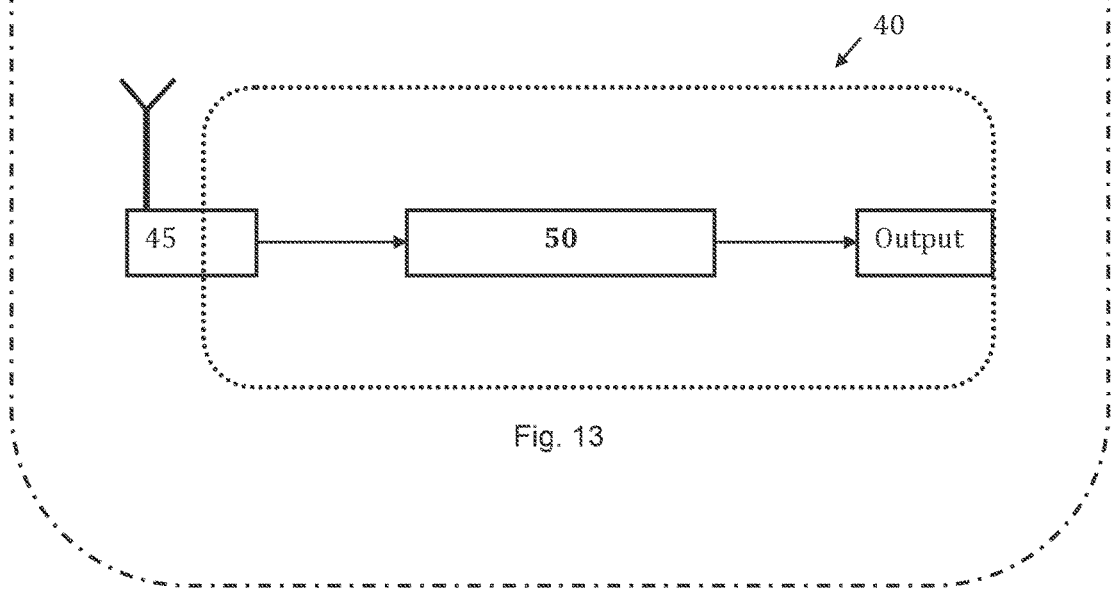
FIG. 13 shows an embodiment of a receiver device.

With reference to FIG. 13 the present receiver device 40 comprises a receiver 45 configured to receive a signal comprising modulated symbols associated with at least one shortened or extended code word having a code rate over a radio channel of the wireless communication system 10. The device 40 further comprises a processor 50 configured to demodulate said received signal. If the code rate is larger than a mother code rate $R_M$ of a mother code word for said shortened or extended code word, the processor 50 de-rate matches said demodulated signal to obtain a de-rate matched demodulated signal and de-interleaves said de-rate matched demodulated signal to obtain said mother code word. If the code rate is not larger than a mother code rate $R_M$ of a mother code word for said shortened or extended code word, the processor de-interleaves said demodulated signal to obtain a de-interleaved demodulated signal and de-rate matches said de-interleaved demodulated signal to obtain said mother code word. Said mother code word is finally decoded to obtain information bits associated with said mother code word.

Such a receiver device is as mentioned shown in FIG. 13, in which the receiver 45 receives signals from a transmitter described above. Thereafter, the processor 50 processes signals from the receiver to obtain the information bits. Further, the receiver device 40 may (optionally) include an output unit for forwarding the obtained information bits. Mentioned units are shown in FIG. 13.

Alternatively the receiver device 40 may comprise dedicated units for performing the present solution. That is, the receiver device 40 comprises in this case:

a receiver for receiving a signal comprising modulated symbols associated with at least one shortened or extended code word having a code rate over a radio channel of the wireless communication system (10);

a demodulator for demodulating said received signal; and a decision unit for deciding if the code rate is larger or not larger than a mother code rate $R_M$ of a mother code word for said shortened or extended code word;

de-rate matcher and de-interleaver units for de-rate match said demodulated signal to obtain a de-rate matched demodulated signal and de-interleave said de-rate matched demodulated signal to obtain said mother code word if the code rate is larger than a mother code rate $R_M$ of a mother code word for said shortened or extended code word;

de-interleaver and de-rate matcher units for de-interleave said demodulated signal to obtain a de-interleaved demodulated signal and de-rate match said de-interleaved demodulated signal to obtain said mother code word if the code rate is not larger than a mother code rate $R_M$ of a mother code word for said shortened or extended code word; and a decoder for decoding said mother code word to obtain information bits associated with said mother code word.

Figure 15:
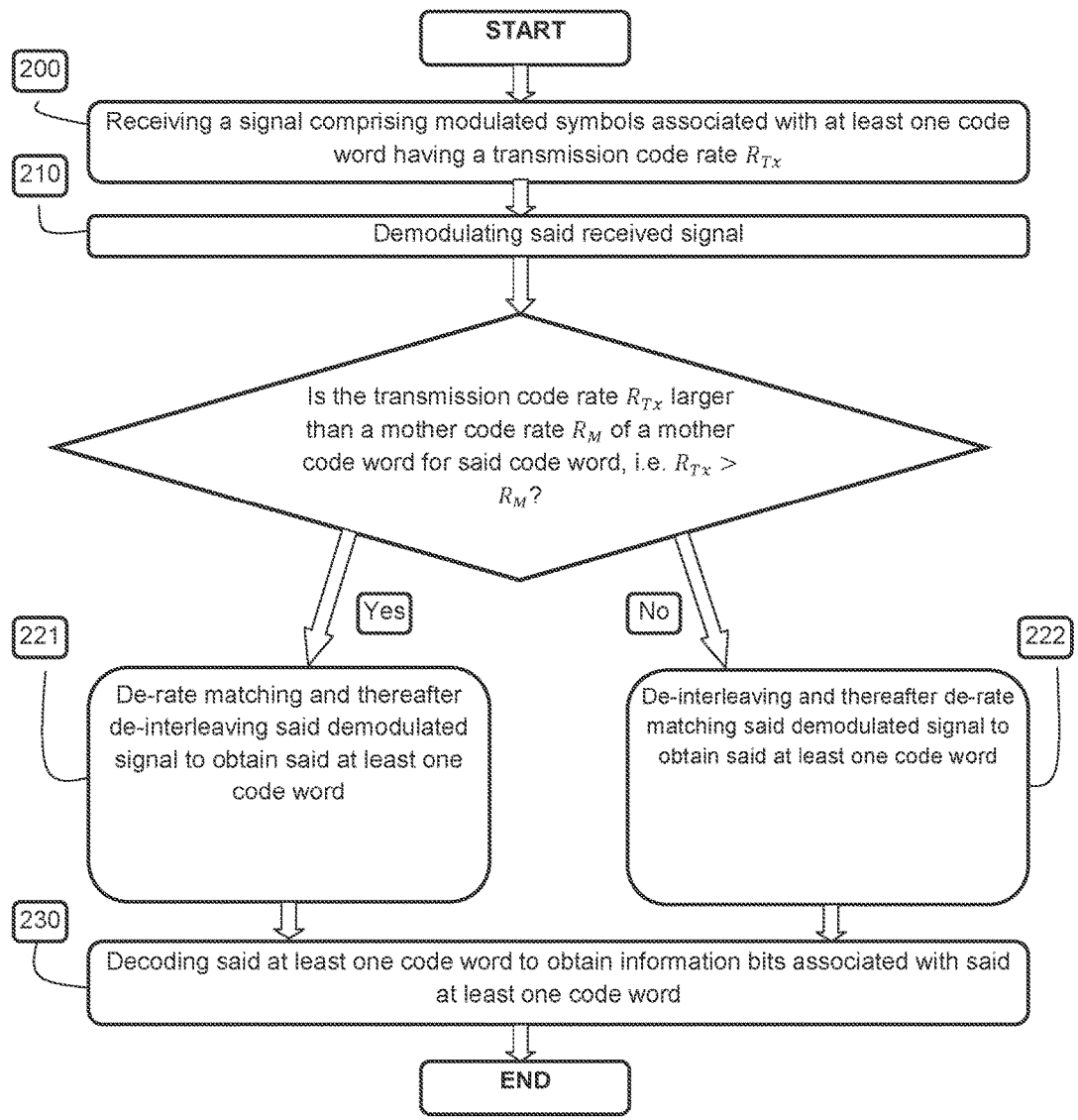
FIG. 15 shows a flow chart of a method in a receiver.

A corresponding method in a receiver device is shown in FIG. 15. The method comprises the steps of receiving 200 a signal comprising modulated symbols associated with at least one shortened or extended code word having a transmission code rate $R_{Tx}$ over a radio channel of the wireless communication system 10; demodulating 210 said received signal; and if the code rate is larger than a mother code rate $R_M$ of a mother code word for said shortened or extended code word, de-rate matching said demodulated signal to obtain a de-rate matched demodulated signal and de-interleaving said de-rate matched demodulated signal to obtain said mother code word 221, if the code rate is not larger than a mother code rate $R_M$ of a mother code word for said shortened or extended code word, de-interleaving said demodulated signal to obtain a de-interleaved demodulated signal and de-rate matching said de-interleaved demodulated signal to obtain said mother code word 222; and decoding 230 said mother code word to obtain information bits associated with said mother code word.

Assuming L is the size of information bits including possible CRC bits. The output of an error correction encoder (using e.g. convolutional code) prior to rate matching algorithm contains N parity streams each consisting of L bits.

For transmission code rates higher than the mother code rate, parity streams are punctured following a predefined puncturing pattern to match the transmission code rate of the communication channel $R_{Tx}$. For these coding rates when puncturing happens, if the interleaver is placed before rate matching unit, interleaving is performed over a vector of length NL. When the interleaver is placed after rate matching unit, interleaving is performed over a shorter vector of already punctured bits.

In the first case, interleaved parity bits corresponding to the same codeword will be more evenly distributed and puncturing will not remove most or all of them away. This will lead to a better performance of communication system. When the code rate is higher, more bits are punctured and consequently the parity bits are more impacted. This can be related directly to the free distance of the punctured code which determines to large extend the number of errors that could be corrected and consequently the performance of the resulted code after puncturing and interleaving.

The free distance is defined as the minimal hamming distance between different encoded sequences. The value of free distance and the multiplicity of it when code words with short error event are considered could be used as a measure to design the best set of encoder, rate matching and interleaver units. It is known that, a code with larger minimum distance and smaller multiplicity of minimum distance value has better correction capabilities and therefore could guarantee a better performance. Therefore, a larger free distance and a smaller multiplicity of free distance for coding rates higher than mother code rate when interleaving is performed prior to rate matching.

Additionally, for very low code rates corresponding to very short block of information bits, if the interleaver is used prior to rate matching, the size of the burst might exceed the length of interleaver. Therefore, interleaver turns to be insufficient to break the burst of error. In this case using the interleaver after rate matching block could help the interleaver to perform on larger block size and it becomes easy to break the burst of errors. In this case, it is better to interleave the resulted repeated codeword rather than interleaving the short block of parity bits. Actually, the codeword size after rate matching is much larger and the burst errors could be distributed along the resulted codeword after the repetition. This behavior could also be predicted using the free distance of the code. In this case, we expect larger free distance for the case when interleaver is used after rate matching.

The block diagram of an embodiment of transmitter and receiver is shown in FIG. 7 and FIG. 8 for the case where there is only one stream of information bit. The case with more streams of information bits is straightforward based on the explanation of FIG. 6.

Further, the MDS bit-interleaver could be implemented as three different interleavers on each of the output parity streams or could be implemented as a single interleaver after concatenating three parity streams as shown in FIG. 7 which is obvious.

In the embodiments in FIGS. 7 and 8 the interleaver and de-interleaver are of LDS matrix type. A clear advantage of this solution is the improvements obtained using simple rectangular interleavers. Moreover, the increase in complexity due to the using the pair of switched interleavers instead of one is small. However, it should be pointed out that the interleavers of rectangular type are one possible choice and that other types of interleavers might represent a good choice with the present solution.

In FIG. 7, a stream of information bits is generated and then CRC is added to the stream of information bit by the "CRC" block. Information bits are sent into the "Error correction coder" block. The "LDS Bit interleaver" block performs interleaving if Switch 1 is open. If Switch 1 is closed, for the coding rates described in the present solution, interleaving is not performed. Afterwards the codeword is sent to the "Rate matching" block. If however Switch 2 is open then interleaving is performed after rate matching. If Switch 2 is closed based on the case explained in the disclosure interleaving in the stage is not performed. Afterwards bits are mapped to symbols when they are passed through the "Modulation" block. The "LDS Tx" block will perform spreading and concurrent transmission of information symbols.

FIG. 8 shows the receiver corresponding to the transmitter described in FIG. 7. Received noisy signal is fed into the "LDS BP-MUD" block. Resulted soft bits after LDS BP-MUD are then feed into LDS de-interleaver if Switch 2 is open. If Switch 2 however is closed, following the coding rates explained in the text of the present disclosure, soft bits are not interleaved and passed directly through the next step which is inverse rate matching in the "Inverse rate matching" block. After inverse rate matching if Switch 1 is open then LDS de-interleaving is performed in the "LDS De-interleaving" block. If Switch 1 is closed, resulted soft bits after inverse rate matching are directly sent to the "Error Correction decoder" block. After decoding, CRC is performed to check if the transmitted bits are correctly received or not.

Although the proposed solution according to this embodiment aims at counteracting the burst-error characteristic of LDS, using the proposed interleaving and rate matching scheme, improvements will also be observed in conventional transmission thanks to the increased free distance and decreased multiplicity of nearest neighbors.

In general case, the rectangular structure of LDS bit interleaver could be a limitation in that it constrains the size of the codeword to be a multiple of certain factors (e.g. the number of columns of the interleaver matrix). If this happens, dummy bits could be added to the codeword to make the length of the code word an integer multiple of the number of columns of interleaver according to another embodiment.

According to a preferred embodiment the LDS is further configured to apply column permutation on elements of interleaver matrices of the LDS matrix interleaver to break further the resulted burst of errors. In such a case, columns of the LDS matrix interleaver explained previously are permuted following a permutation pattern. The permutation pattern associates a new column index to each of the original column indexes. When de-interleaving, the inverse operation is performed to recollect the original column number using the permutation pattern that is common to transmitter or receiver. The permutation pattern can be dynamically or statically computed, or signaled.

In the proposed scheme, depending on the code rate one could place interleaver before or after rate matching block. When the transmission coding rate is higher than mother code rate the interleaver acts prior to rate matching to guarantee that punctured parity bits corresponding to the same codeword are not all removed away. Contrary, for transmission coding rates lower than mother code rate and short information block size the interleaver acts after rate matching block to guarantee that the error burst is distributed evenly.

There are two switches in this embodiments which are opened or closed as a function of the transmission code rate that are captured in FIG. 7 and FIG. 8. For transmission code rates higher than the mother code rate switch number one, shown as Switch 1, is open and switch number two, shown as Switch 2, is closed. Therefore, interleaving is performed prior to rate matching. For low transmission code rates, switch number one is closed and switch number two is open. Therefore, interleaving is acting after rate matching.

Consequently, when e.g. the second interleaver is active in the transmitter an interleaving is performed after rate matching (switch two open) in transmitter, first de-interleaver is also active in the receiver and de-interleaving is performed prior to de-rate matching (switch two in receiver is open).

As mentioned previously, an indication to the possible transmission rate that receiver can support is sent via CQI feedback from the receiver to transmitter. The transmitter based on this indication derive transmission code rate $R_{Tx}$ which is the code rate which is not necessarily equal to indicated code rate and is computed considering the number of data resource elements in transmission (removing resource elements related to pilots in the sub-frame). If it turns out that this transmission code rate is equal to the mother code rate, then there is no puncturing needed in the system. If puncturing is not used either both aforementioned schemes could be used knowing that the free distance of the interleaver followed by the puncturing unit or the inversely puncturing unit followed by interleaver will be the same resulting in the same performance. For example, one could interleave first before rate matching unit in the transmitter. In the receiver first de-rate matching and then interleaving is performed.

Figure 9:
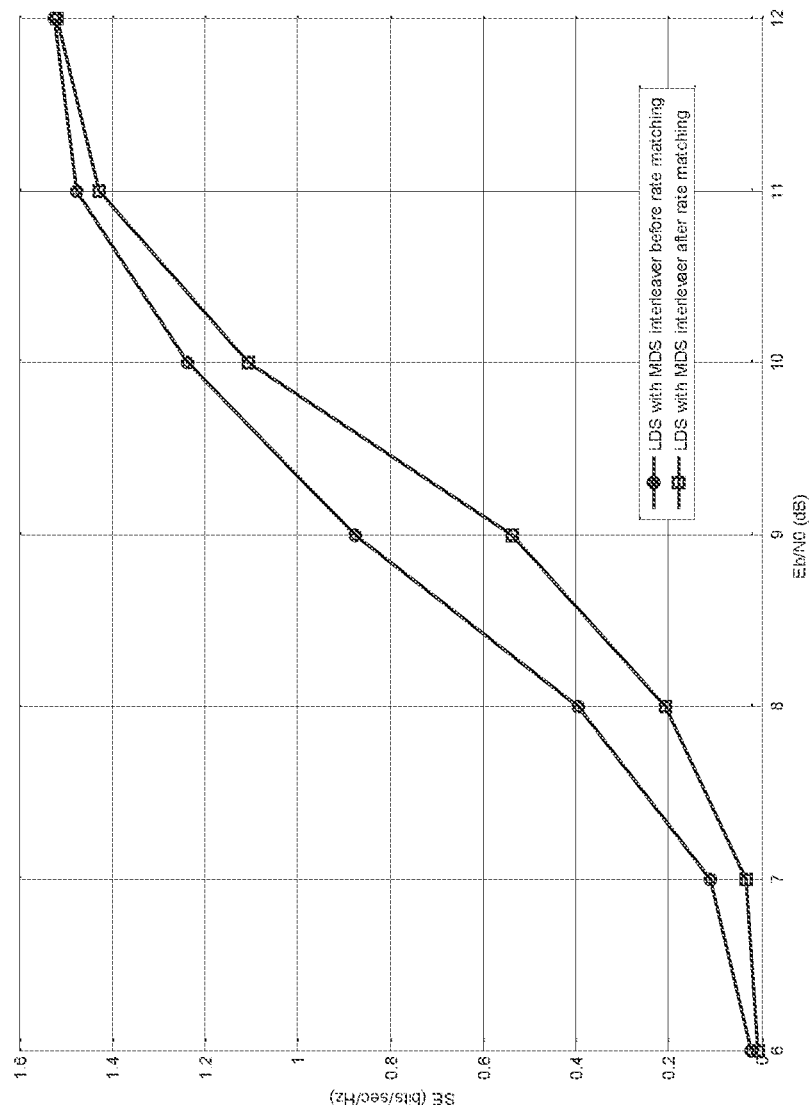
FIG. 9 shows spectral efficiency for code rate R=0.4—convolutionally coded system.
Figure 10:
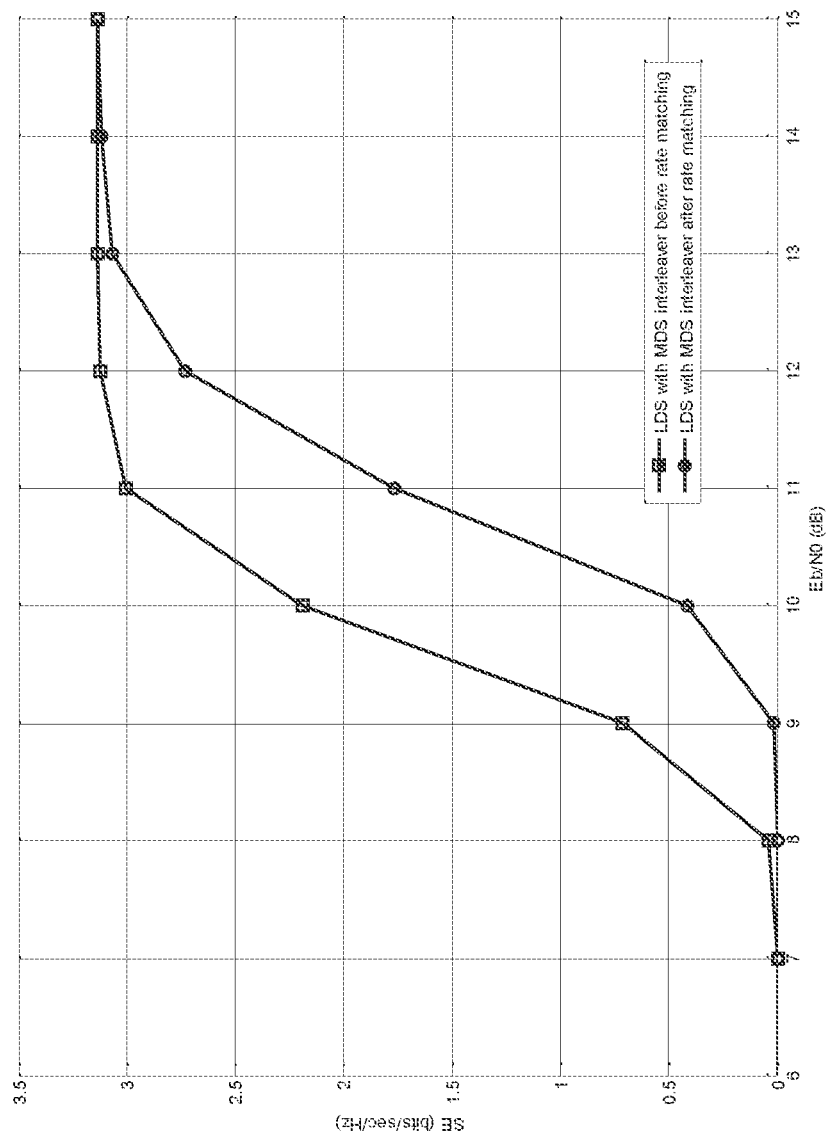
FIG. 10 shows spectral efficiency for code rate R=0.8—convolutionally coded system.
Figure 11:
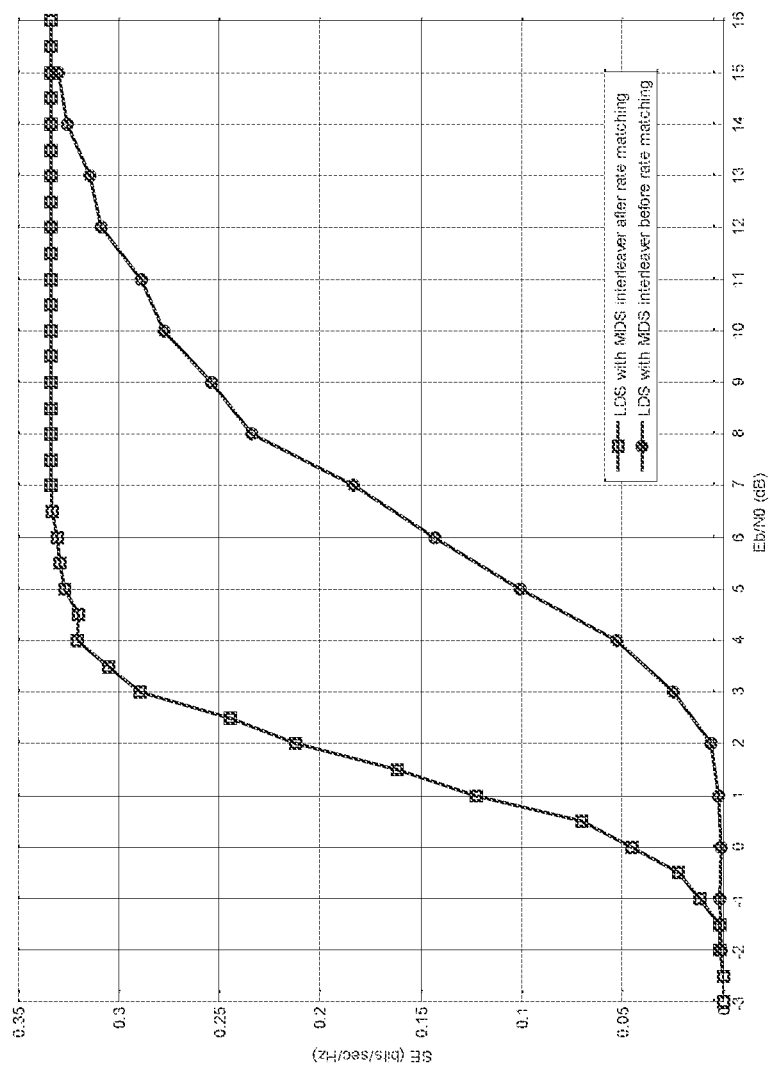
FIG. 11 shows spectral efficiency for code rate R=0.1—convolutionally coded system.

FIG. 9, FIG. 10 and FIG. 11 illustrate the spectral efficiency of embodiments with LDS schemes using different type of interleavers. The comparison is carried out in terms of Spectral Efficiency (SE), defined as:

$$SE = \frac{n}{m} MR(1 - BLER)$$

where $$\frac{n}{m}$$

is being the system overloading factor, M is the modulation order and BLER is the Block Error Rate. SE is measured in bits/sec/Hz. The overall coding rate is $R=R_C R_{CRC}$, where $R_C=S/T$ is the channel code rate and $R_{CRC}$ is the rate of the CRC code. S denotes the size of the information word including CRC bits and T is the number of coded bits. The BLER is estimated through Monte Carlo simulation for a range of Signal to Noise Ratio (SNR) values.

The SNR flavor herein adopted is the ratio $E_b/N_0$ of the information bit energy to noise energy, where $N_0=2\sigma_z^2$ is the two-sided power spectral density of noise. We choose for all our simulations the signature matrix with n×m=12×24 which corresponds to an overloading factor of $$\frac{n}{m} = 2.$$

Concerning the channel coding schemes, we considered one scheme specified in the 3GPP LTE standard. This scheme consists of a 64-state feed-forward binary convolutional code with rate ⅓ and free distance $d_f=15$. It is encoded using a constraint-length K=7 encoder with generators [133, 171, 165]$_8$. The code trellis is terminated using a tail-biting technique. For puncturing, we have used the circular buffer rate matching as per LTE standard which is described in the background.

As specified in the LTE standard, a CRC check is attached to the information word before encoding to enable detection of residual decoding errors. In the case of convolutional coding, the CRC parity size is $P_{CRC}=16$ bits. The resulting CRC code rate is $$R_{CRC} = \frac{S - P_{CRC}}{S}$$

The set of parameters used in simulations are shown in the following Table 1.

TABLE 1

| Simulation parameters | |
|---|---|
| Code rate | Conv. code |
| 1/10 | S = 96, T = 960 |
| 4/10 | S = 384, T = 960 |
| 8/10 | S = 768, T = 960 |

In all simulations, we perform the transmission of an information word of S bits on 240 time-frequency resource elements. Coded bits are modulated using quadrature phase-shift keying (QPSK) modulation thus, taking into account the overloading factor, we obtain a code word length of 960 coded bits. Additional set of parameters used in simulations are reported in Table 1.

FIG. 9 shows the spectral efficiency for transmission code rate 0.4. It is shown that using an MDS interleaver before rate matching performs better compared to the case where MDS interleaver is used after rate matching. FIG. 10 shows spectral efficiency for transmission code rate 0.8. It is shown that having interleaver before rate matching has even a larger gain in this rate, as expected.

In order to prove the observed behavior, we have computed the free distance of the encoder-rate matching-interleaver unit for the corresponding setups with different orders.

In brief, a code word can be represented as a path in the trellis diagram (the correct path). An error event is a trellis path that diverges from the correct path at a certain discrete time instant t and re-merges into the correct path at another instant t+d. The length of the error event is d trellis steps. Assuming that the convolutional encoder has constraint length K and that the correct path is the all-zero path.

The shortest error event has length K in the trellis. All code words with a single error event of length K are generated by the information words with Hamming weight 1: '1000000 . . . ' and all its circular shifts;

The error event with length K+1 is generated by the information word '11000000 . . . ' and all its circular shifts;

The error events with length K+2 are generated by the information words '101000000 . . . ' and '111000000 . . . ' and all their circular shifts;

The error events with length K+3 are generated by the information words '10010000 . . . ', '10110000 . . . ', '11010000 . . . ', '11110000 . . . ' and all their circular shifts; and so forth.

Encoder-rate matching these information words and counting the Hamming weights of the corresponding code words gives the lower-order terms of the weight enumerating function, hence the free distance and its multiplicity. In order to compute the free distance we have considered a few lengths (K, K+1, K+2 and K+3).

Free distance and the multiplicity of the free distance for these cases are shown in table 2.

TABLE 2

Free distance and its multiplicity for different cases

| Rate | Interleaver before rate matching | | Interleaver after rate matching | |
| --- | --- | --- | --- | --- |
| | $d_{free}$ | multiplicity | $d_{free}$ | multiplicity |
| 0.4 | 10 | 921 | 8 | 78 |
| 0.8 | 3 | 303 | 3 | 568 |

It is shown in table 2 that for transmission code rate 0.4 using interleaver before rate matching gives a free distance larger than using interleaver after rate matching which is in line with the observed performance of the code in this rate. Indeed, the obtained performance is better when MDS interleaver is used before rate matching.

For transmission code rate 0.8 when interleaving before or after rate matching we observe the same value of free distance but the multiplicity is lower when interleaver is used before rate matching. This shows that there is less number of nearest neighbors for this case and therefore a better performance could be expected. This is in line with the performance curve where we have a gain when we use MDS interleaver before rate matching unit.

We can see from FIG. 11 and Table 1 that the low rate and the fixed codeword size lead to using a very short information word. As a consequence interleaver placed before rate matching unit proves insufficient for breaking up error burst and the performance is greatly impacted. In this case, it is desirable to have interleaver after rate matching unit.

Table 3 summarizes computed free distances and its multiplicity. In this case, the free distance of the code is same for all the cases but the number of nearest neighbors when interleaving is used after rate matching is the smallest one which let us expect the best performance.

TABLE 3

Free distance and its multiplicity for different cases

| Rate | Interleaver before rate matching | | Interleaver after rate matching | |
| --- | --- | --- | --- | --- |
| | $d_{free}$ | multiplicity | $d_{free}$ | multiplicity |
| 0.1 | 48 | 88 | 48 | 41 |

The present solution could be used with other type of error correction codes, such as turbo codes and convolutional codes. As explained in background information rate matching and interleaver units are present for other type of encoders. For example for the case of turbo code rate matching unit punctures parity bits resulted from turbo codes. After rate matching, systematic bits and parity bits are interleaved independently. Therefore, one could in similar way perform interleaving before or after rate matching based on the transmission code rate.

However, in the case of turbo code computation of free distance is different due to the internal feedback and internal interleaver. This will not prevent the fact that the interleaver and rate matching unit could be switched with different coding rates as explained for the case of convolutional code.

The present solution might be additionally used for all the cases where spreading is used in the transmitter such as conventional CDMA, MC-CDMA, and HSDPA.

The present solution might further be an integrated part of MIMO transmissions. Actually in multi-user MIMO (MU-MIMO) transmission different users or different data streams are linearly combined together in the spatial domain using specific transmit precoders. This is similar to LDS where different streams are linearly combined using LDS transmitter, with LDS transmitter acting on code domain. Therefore, the function and the structure of MU-MIMO transmission is similar to the one of LDS precoder. Consequently the disclosure is valid and well suited for MU-MIMO set up.

More importantly, using LTE interleaver after rate matching unit could potentially increase the system spectral efficiency.

Furthermore, any method according to the present solution may be implemented in a computer program, having code means, which when run by processing means causes the processing means to execute the steps of the method. The computer program is included in a computer readable medium of a computer program product. The computer readable medium may comprise of essentially any memory, such as a ROM, a PROM, an EPROM, a Flash memory, an EEPROM, or a hard disk drive.

Moreover, it is realized by the skilled person that the present devices (transmitter and receiver) comprise the necessary communication capabilities in the form of e.g., functions, means, units, elements, etc., for performing the present solution. Examples of other such means, units, elements and functions are processors, memory, control logic, encoders, decoders, mapping units, multipliers, decision units, selecting units, switches, interleavers, de-interleavers, modulators, demodulators, inputs, outputs, antennas, amplifiers, receiving (RX) unit, transmitting (TX) unit, digital signal processors (DSPs), Maximum Distance Separable (MDS) bit interleaver, trellis-coded modulation (TCM) encoder, TCM decoder, interfaces, communication protocols, etc. which are suitably arranged together.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

What is claimed is:

1. A transmitter device for a wireless communication system, the transmitter device comprising:
    a transceiver that receives at least one stream of information bits;
    a memory comprising instructions; and
    a processor coupled to the transceiver and the memory, wherein the instructions cause the processor to:
        encode the at least one stream of information bits using at least one error correction code to obtain at least one mother code word having a mother code rate ($R_M$);
        perform interleaving and rate matching based on the $R_M$ and a transmission code rate ($R_{TX}$) associated with the at least one mother code word, wherein the $R_M$ comprises a ratio of a number of information bits divided by a number of coded bits, wherein the $R_{TX}$ comprises a ratio of the number of information bits divided by a total number of bits transmitted over resource elements used for data transmission, and wherein performing interleaving and rate matching based on the $R_M$ and the $R_{TX}$ comprises:

first interleaving the at least one mother code word to obtain an interleaved code word, and second rate matching the interleaved code word to obtain a shortened code word having a code rate that is higher than the $R_M$ when the $R_M$ is smaller than the $R_{Tx}$ associated with the at least one mother code word; and first rate matching the at least one mother code word to obtain an extended code word, and second interleaving the extended code word having a code rate that is lower than the $R_M$ when the $R_M$ is not smaller than the $R_{Tx}$ associated with the at least one mother code word; and modulate the shortened or extended code word to obtain modulated symbols, and wherein the transceiver transmits a signal comprising the modulated symbols over a radio channel of the wireless communication system.

2. The transmitter device according to claim 1, wherein the processor comprises a Low Density Spreading (LDS) matrix interleaver for interleaving the at least one mother code word or extended code word.

3. The transmitter device according to claim 2, wherein the LDS matrix interleaver applies column permutation on elements of interleaver matrices.

4. The transmitter device according to claim 2, wherein the LDS matrix interleaver size is adapted to different code rates associated with different streams of information bits for transmission.

5. The transmitter device according to claim 2, wherein the LDS matrix interleaver adds dummy bits to the shortened or extended code word such that a code word length of the shortened or extended code word is a multiple of the number of columns of an interleaver matrix.

6. The transmitter device according to claim 2, wherein the LDS matrix interleaver is a rectangular interleaver.

7. The transmitter device according to claim 1, wherein the transmitter device comprises a Code Division Multiple Access (CDMA) transmitter, a High Speed Downlink Packet Access (HSDPA) transmitter, or a Multi Carrier (MC)-CDMA transmitter adapted for transmitting the signal.

8. The transmitter device according to claim 7, wherein the CDMA transmitter, the HSDPA transmitter, or the MC-CDMA transmitter is configured to use more signature sequences than chips for transmission when transmitting the signal.

9. The transmitter device according to claim 8, wherein the signature sequences are sparse signature sequences.

10. The transmitter device according to claim 1, wherein the error correction code is a turbo code or a convolutional code.

11. A receiver device for a wireless communication system, the receiver device comprising:

a receiver that receives a signal comprising modulated symbols associated with at least one shortened or extended code word having a code rate over a radio channel of the wireless communication system;

a memory comprising instructions; and a processor coupled to the receiver and the memory, wherein the instructions cause the processor to:

demodulate the received signal to obtain a demodulated signal;

perform de-interleaving and de-rate matching based on a mother code rate ($R_M$) and a transmission code rate ($R_{TX}$) associated with at least one mother code word, wherein the $R_M$ comprises a ratio of a number of information bits divided by a number of coded bits, wherein the $R_{TX}$ comprises a ratio of the number of information bits divided by a total number of bits transmitted over resource elements used for data transmission, and wherein performing de-interleaving and de-rate matching based on the $R_M$ and the $R_{TX}$ comprises:

first de-rate matching the demodulated signal to obtain a de-rate matched demodulated signal and second de-interleaving the de-rate matched demodulated signal to obtain the mother code word when the code rate is larger than the $R_M$ of the mother code word for the shortened or extended code word; and first de-interleaving the demodulated signal to obtain a de-interleaved demodulated signal and second de-rate matching the de-interleaved demodulated signal to obtain the mother code word when the code rate is not larger than the $R_M$ of the mother code word for the shortened or extended code word; and decode the at least one code word to obtain information bits associated with the mother code word.

12. A transmission method in a wireless communication system, the method comprising:

receiving at least one stream of information bits;

encoding the at least one stream of information bits using at least one error correction code to obtain at least one mother code word having a mother code rate ($R_M$);

perform interleaving and rate matching based on the $R_M$ and a transmission code rate ($R_{TX}$) associated with the at least one mother code word, wherein the $R_M$ comprises a ratio of a number of information bits divided by a number of coded bits, wherein the $R_{TX}$ comprises a ratio of the number of information bits divided by a total number of bits transmitted over resource elements used for data transmission, and wherein performing interleaving and rate matching based on the $R_M$ and the $R_{TX}$ comprises:

first interleaving the at least one mother code word to obtain an interleaved code word, and second rate matching the interleaved code word to obtain a shortened code word having a code rate that is higher than the $R_M$ when the $R_M$ is smaller than the $R_{TX}$; and first rate matching the at least one mother code word to obtain an extended code word, and second interleaving the extended code word having a code rate that is lower than the $R_M$ when the $R_M$ is smaller than the $R_{TX}$;

modulating the shortened or extended code word to obtain modulated symbols; and transmitting a signal comprising the modulated symbols over a radio channel of the wireless communication system.

13. The transmission method according to claim 12, wherein the method further comprises interleaving the at least one mother code word or extended code word by a Low Density Spreading (LDS) matrix interleaver.

14. The transmission method according to claim 13, wherein the method further comprises applying column permutation on elements of interleaver matrices.

15. The transmission method according to claim 13, wherein the method further comprises adapting the LDS matrix interleaver size to different code rates associated with different streams of information bits for transmission.

16. The transmission method according to claim 13, wherein the method further comprises adding dummy bits to the shortened or extended code word such that a code word length of the shortened or extended code word is a multiple of the number of columns of an interleaver matrix.

17. A receiving method in a wireless communication system, the method comprising:
receiving a signal comprising modulated symbols associated with at least one shortened or extended code word having a code rate over a radio channel of the wireless communication system;
demodulating the received signal to obtain a demodulated signal;
perform de-interleaving and de-rate matching based on a mother code rate ($R_M$) and a transmission code rate ($R_{TX}$) associated with at least one mother code word, wherein the $R_M$ comprises a ratio of a number of information bits divided by a number of coded bits, wherein the $R_{TX}$ comprises a ratio of the number of information bits divided by a total number of bits transmitted over resource elements used for data transmission, and wherein performing de-interleaving and de-rate matching based on the $R_M$ and the $R_{TX}$ comprises:
first de-rate matching the demodulated signal to obtain a de-rate matched demodulated signal and second de-interleaving the de-rate matched demodulated signal to obtain the mother code word when the code rate is larger than the $R_M$ of the mother code word for the shortened or extended code word; and
first de-interleaving the demodulated signal to obtain a de-interleaved demodulated signal and second de-rate matching the de-interleaved demodulated signal to obtain the mother code word when the code rate is not larger than the $R_M$ of the mother code word for the shortened or extended code word; and
decoding the mother code word to obtain information bits associated with the mother code word.

* * * * *